United States Patent [19]
Hattman, III

[11] 3,797,344
[45] Mar. 19, 1974

[54] ELECTROMECHANICAL APPARATUS FOR CUTTING COILS OF POLYESTER FOAM STRIP OR THE LIKE

[76] Inventor: Henry H. Hattman, III, 38 William Dr., Coraopolis, Pa. 15108

[22] Filed: Dec. 15, 1972

[21] Appl. No.: 315,340

[52] U.S. Cl............ 83/171, 83/358, 83/416, 83/431, 83/437, 83/651.1, 83/926 B
[51] Int. Cl................................ B26f 3/12
[58] Field of Search......... 83/171, 358, 416, 431, 83/437, 651.1, 926 B

[56] References Cited
UNITED STATES PATENTS

| | | | |
|---|---|---|---|
| 3,199,388 | 8/1965 | Redfield | 83/171 X |
| 3,333,494 | 8/1967 | Smith | 83/171 X |
| 3,540,336 | 11/1970 | Kelsey | 83/171 |

Primary Examiner—Frank T. Yost
Attorney, Agent, or Firm—Brown, Murray, Flick & Peckham

[57] ABSTRACT

An electromechanical apparatus for subdividing a coil of polyester foam material into one or more coils. The apparatus includes a carriage with V-shaped support surfaces for supporting the coil. A plurality of wheels extend from the carriage for support by stationary tracks that extend in a direction normal to the axis of the coil. An electrically heated wire is connected at its ends to springs and electric insulators that are carried by a C-shaped frame arranged at one side of the carriage. The springs compensate for length changes of the wire during heating thereof. The wire extends through a slot in the carriage such that upon displacement of the carriage by a drive means toward the wire, a coil located on the carriage is divided into predetermined widths. A power control circuit is used for heating the resistance wire.

11 Claims, 3 Drawing Figures

PATENTED MAR 19 1974  3,797,344

ELECTROMECHANICAL APPARATUS FOR CUTTING COILS OF POLYESTER FOAM STRIP OR THE LIKE

BACKGROUND OF THE INVENTION

This invention relates to an apparatus for severing a coil of polyester foam strip or the like by passing an electrically heated wire through the coil in the direction transverse to the axis thereof.

It is necessary incident to the final usage of coils of many forms of strip material, to subdivide the strip into panels having desired dimensions. Many materials including polyester foam present certain difficulties to accomplish this subdivision. One of the principal difficulties is that the material is very light weight which renders it very unstable even when in coiled form to the necessary operations of cutting the coil to widths suitable for further subdivision into desired strip lengths to form an ultimately desired panel. These panels may be used for any one of a number of purposes, and one such use has been to incorporate them within a frame-like structure to form filter assemblies that may be used in household heating furnaces or similar applications for the filtration of air.

The polyester foam type of strip material presently under discussion is characterized by a fibrous-like material which is formed into a mat having a weight of 3 to 7 ounces per square yard in thicknesses of 0.5 to 0.75 inch. Typically, a strip 90 to 135 feet long is coiled at widths between 50 and 60 inches wide into a coil of 40 to 60 inches in diameter.

When this material is in coiled form, it is difficult to establish and maintain an accurate aligned relationship between successive convolutions of the strip, so that cutting of the coil can be accomplished. Prior to the present invention, the coils of this material had to be unwound and the cutting of the strip into panels having desired dimensions was accomplished by means of a knife or similar device. This presented a very time consuming operation that did not produce acceptable results in many instances because it was difficult to cut the material to the required exact dimensions.

SUMMARY OF THE INVENTION

It is an object of the present invention to provide an apparatus for severing coils of polyester foam or the like by supporting a coil of such material in a manner that a heated wire can be passed there through in a direction normal to the axis of the coil in order to sever the coil into desired widths.

It is a further object of the present invention to provide an apparatus for severing coils of polyester foam or the like wherein such coils are supported on a carriage for transverse movement relative to a heated wire in order to sever the coil into a plurality of coils having a desired width.

In one form of the present invention, there is provided an apparatus for severing coils of polyester foam or the like comprising: carriage means including a support surface for receiving a coil of polyester foam, means for guiding the carriage in a predetermined direction, an electrically heated wire, including means for yieldably supporting of the wire, a frame for mounting the wire in a predetermined relation to the carriage, means for producing relative displacement between the heated wire and the carriage means, and power means including control for heating the wire to a predetermined temperature to effect severing of the coil supported by the carriage.

In its preferred form, there is provided a slot in the carriage through which the wire extends so that as the carriage is displaced relative to the wire, the coil supported in the carriage remains in its supported relation throughout the severing of the coil. The preferred form of the present invention further includes a drive for displacing the carriage relative to the heated wire to maintain a desired feed rate incident to severing of the coil.

These features and advantages of the present invention as well as others will be more apparent when the following description is read in light of the accompanying drawings, in which.

Figure 3:
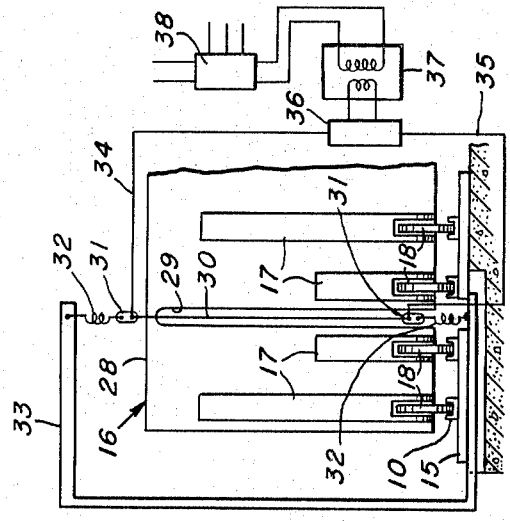
FIG. 3 is an end elevational view of the apparatus shown in FIG. 1.
Figure 2:
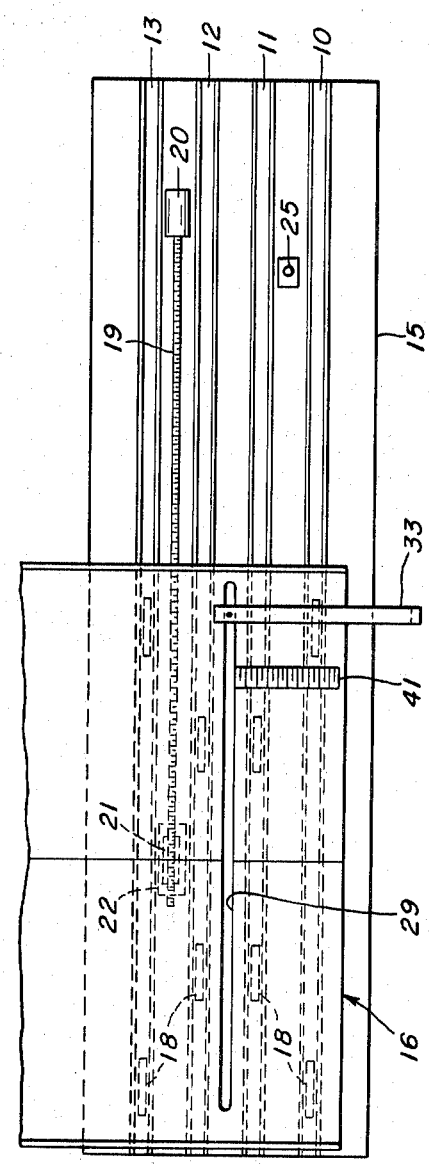
FIG. 2 is a plan view of the apparatus shown in FIG. 1.
Figure 1:
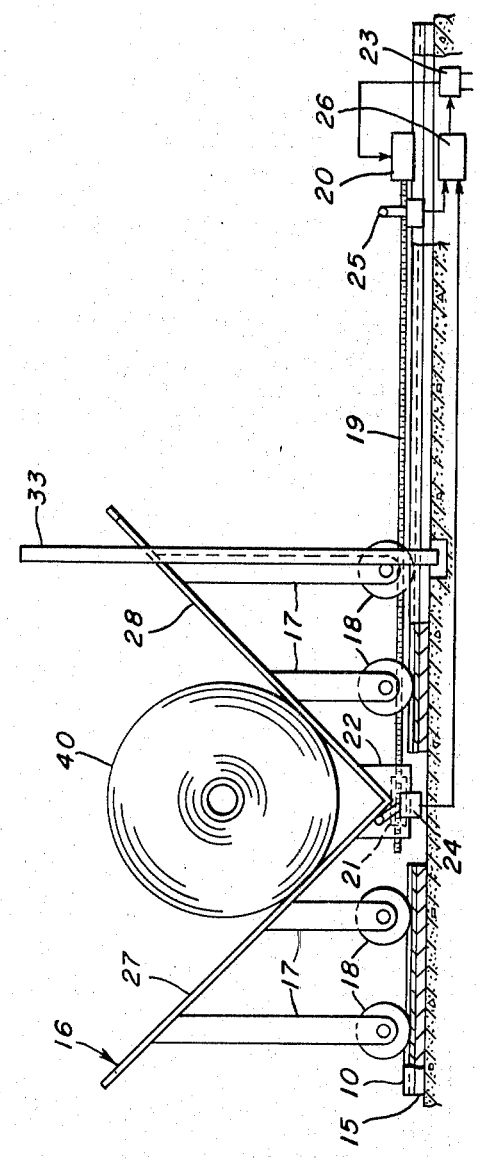
FIG. 1 is an elevational view of an apparatus for severing a coil of polyester strip embodying the features of the present invention.

With reference now to FIGS. 1-3 of the drawings, the apparatus illustrated therein includes spaced, parallel tracks 10, 11, 12 and 13 which are, in turn, supported by a foundation mounted platform 15. A carriage 16 is supported for transverse movement along the rails by pedestals 17 having wheels 18 at their lower ends. The wheels 18 ride within the tracks 10–13. The carriage is horizontally displaced along the tracks by drive means including an elongated feed screw 19 extending parallel to the track 12 and 13 where it is supported at both ends by a bearing block, not shown, and driven by a motor 20 which is attached to the platform 15. The screw 19 passes through a nut 21, which is carried by a bracket 22 extending downwardly from the underside of the carriage. A control system is provided to the motor 20. This system includes a motor controller 23 receiving the output signal from a limit switch circuit which takes the form of a limit switch 24 attached to the platform 15 for contact with the carriage at its extreme left hand position, and a limit switch 25 attached to the platform 15 for contact with the carriage at its extreme right hand position, as one views FIG. 1. Instead of employing limit switches 24 and 25, a rotary type limit switch may be used with equal success. The output signals from the limit switches 24 and 25 are received by a switching circuit 26 connected to the motor controller 23.

The carriage includes plates 27 and 28 arranged in a V-shaped configuration and having a slot 29 formed in the plates. This slot is arranged so that it extends parallel to the direction of carriage movement on the rails. The slot is dimensioned for unobstructed passage of an electrical resistance wire 30 having at its ends insulators 31 which are, in turn, connected by springs 32 to a C-shaped frame 33. This frame is supported at one side of the base 15 whereby the lower leg of the frame extends below the base. Very successful results have been obtained when the wire 30 was selected as No. 18 gage "Nichrome", or other types of alloy steel wire. A stainless steel wire, 1/16 in. dia., will also yield very desirable results. In both of these forms, the wire is heated electrically through leads 34 and 35 which are connected to opposite ends of the wire 30 and joined to a control 36. The control is, in turn, connected to a step-down transformer 37. In its preferred form, the transformer receives a standard current of 120 VAC with a secondary winding which is preferably selected (manually) for delivering, approximately, 25 volts at 21 amperes. As the wire is heated, it elongates to such a magnitude that compensation for the increased length must be made which, according to the present invention, is accomplished by employing the springs 32 which maintain a substantially uniform tension on the wire notwithstanding changes in the length thereof. In one actual embodiment of the invention, it was discovered that the wire when having a length of approximately 40 inches grew in length when in its heated condition to approximately 43 inches. The springs 32 were designed to compensate for length changes of this magnitude.

In the automatic form, the present invention includes a controller 38 to provide a programmed operation for energizing transformer 37 and controller 23.

A coil polyester foam is shown at 40 in its supported relation within the V-shaped arrangement of the plates 27 and 28 of the carriage 16. In this position, the coil has its axis extending horizontally.

In the operation of the present invention, the coil of polyester foam strip is positioned on the carriage as described. The coil may have a width between 50 and 60 inches long formed by coiling a strip whose length is 90–135 feet, respectively. The coil diameter is 40 inches. The coil is then positioned so that it extends beyond the slot 29, say for example, one-eighth or one-fourth of an inch. The control 36 is actuated to heat the wire 30. The carriage is then traversed by actuating the controller 23 to energize the motor 20 to displace the carriage in the direction to the right as one views FIG. 1, thereby trimming from the coil the irregular edge portion for the purpose of trueing up the coil. After this has been accomplished, the coil is then indexed forward to a predetermined position which may be selected through the use of a length gage 41, whereby the coil can be positioned for a desired width of cut. After this occurs, the carriage is then traversed toward the left as one views FIG. 1 for subdividing the coil into a first coil portion having a desired width. After this has been accomplished, the remaining coil is then indexed along its axis so that a second width of coil extends beyond the slot 29. Following this, the carriage is again shifted to subdivide the coil into a second desired width. This process then continues until the coil is subdivided into widths which are determined according to the needs. These coils are then unrolled and cut into suitable lengths if required. This may be accomplished by employing the apparatus according to the present invention.

In place of the springs 32, a counterweight can be connected to the lower end of the wire 30 or insulator 31 to yieldably support the electrically heated wire.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. An apparatus for severing a coil of polyester foam strip or the like into a plurality of coils each having preselected width, comprising:

carriage means for supporting said coil such that the axis of the coil extends in a preselected direction;

a wire support frame including arms extending toward said carriage means;

an electrically heated wire including means for yieldably supporting said wire from at least one of said arms;

said wire extending in a direction normal to the axis of said coil; and drive means for producing relative displacement between said coil of strip and said electrically heated wire thereby to pass the heated wire through the convolution of coiled strip and sever the coil into smaller width coils.

2. An apparatus according to claim 1 wherein said carriage means comprise plates arranged to define V-shaped support surfaces for supporting said coil of strip.

3. An apparatus according to claim 2 wherein said carriage means further comprise a plurality of wheels, supported by said carriage, a plurality of tracks receiving said wheels for horizontal displacement of said carriage means relative to said heated wire.

4. An apparatus according to claim 3 wherein said V-shaped support surfaces are constructed and arranged to support said coil of strip such that the said axis thereof extends in a horizontal direction and further characterized as normal to the direction of horizontal displacement of the carriage means.

5. An apparatus according to claim 4 wherein said drive means further comprise an elongated feed screw extending parallel to said tracks, a nut threadably engaging said feed screw and supported by said carriage.

6. An apparatus according to claim 5 wherein said drive means further comprise limit switch means positioned at spaced apart locations for detecting travel of said carriage means following severing of said coil.

7. An apparatus according to claim 4 wherein said V-shaped support surfaces further comprise an elongated slot extending parallel to said tracks, said slot receiving said electrically heated wire for connection to one of said arms of the wire support frame disposed below said carriage means.

8. An apparatus according to claim 7 wherein said means for yieldably supporting said wire further include support members for resiliently connecting said wire to said wire support frame.

9. An apparatus according to claim 8 further comprising an electric insulator interconnecting each end of said electrically heated wire to said resilient means, and said resilient means comprising coil spring supported by the arms of said frame.

10. An apparatus according to claim 9 further comprising a control for delivering electric power to the opposite ends of said electrically heated wire, and a step down transformer for supplying electric power to said control.

11. An apparatus according to claim 10 further comprising limit switch means for detecting travel of said carriage means following severing of a coil, and controller means for sequentially actuating said transformer and said drive means.

\* \* \* \* \*